United States Patent
Merlo et al.

(10) Patent No.: US 8,195,552 B1
(45) Date of Patent: Jun. 5, 2012

(54) SYSTEM AND METHOD FOR EVALUATING RISK ASSOCIATED WITH PROPERTY

(75) Inventors: Anthony Merlo, Temecula, CA (US); Chris Leavell, San Diego, CA (US); Christy Wilson, Vista, CA (US); William Van Rooyen, San Diego, CA (US); Kariem Ortiz-Vincenty, San Diego, CA (US); Greg Schneider, San Diego, CA (US)

(73) Assignee: CoreLogic Valuation Services, LLC, Santa Ana, CA (US)

( * ) Notice: Subject to any disclaimer, the term of this patent is extended or adjusted under 35 U.S.C. 154(b) by 2672 days.

(21) Appl. No.: 10/849,702

(22) Filed: May 20, 2004

(51) Int. Cl.
*G06Q 40/00* (2012.01)
(52) U.S. Cl. .......................................... 705/36 R; 705/35
(58) Field of Classification Search .................... 705/38, 705/35, 36 R, 1, 7
See application file for complete search history.

(56) References Cited

U.S. PATENT DOCUMENTS

| | | | |
|---|---|---|---|
| 6,615,187 B1 * | 9/2003 | Ashenmil et al. | 705/36 R |
| 2002/0099650 A1 * | 7/2002 | Cole | 705/38 |
| 2003/0023462 A1 * | 1/2003 | Heilizer | 705/4 |
| 2004/0019557 A1 * | 1/2004 | Yaruss et al. | 705/38 |
| 2004/0243509 A1 * | 12/2004 | Schulkins | 705/38 |
| 2004/0254803 A1 * | 12/2004 | Myr | 705/1 |
| 2005/0171822 A1 * | 8/2005 | Cagan | 705/7 |

* cited by examiner

*Primary Examiner* — Kelly Campen
(74) *Attorney, Agent, or Firm* — Snell & Wilmer LLP

(57) ABSTRACT

The system and method for evaluating risk associated with a subject property include receiving first information including a first estimated value of the subject property. The system and method also include receiving second information regarding the subject property. The second information includes a second estimated value of the subject property, property location information, such as median or average property values, appreciation information, demographic information, and population information. Based upon the received first and second information, the system and method calculate a risk value indicating the risk associated with the subject property.

14 Claims, 8 Drawing Sheets

Sample First Input Data

| Loan # | Borrower | Street # | Address | City | State | Zip | Appraised |
|---|---|---|---|---|---|---|---|
| 1 | TestName 1 | 408 | Alpha Ave | Ann Arbor | MI | 48103 | $190,000.00 |
| 2 | TestName 2 | 5904 | Beta Ave | Alexandria | VA | 22310 | $660,000.00 |
| 3 | TestName 3 | 1230 | Gamma Ave | Tucson | AZ | 85715 | $187,000.00 |
| 4 | TestName 4 | 211 | Delta Ave | Arlington | TX | 76014 | $107,000.00 |
| 5 | TestName 5 | 2803 | Epsilon Ave | Fullerton | CA | 92835 | $950,000.00 |

FIG. 4

Sample Second Input Data

| Loan Number | AVM Value | Confidence | Median Value | Appreciation | State Apprec | Dem. Loc. | Pop. Density |
|---|---|---|---|---|---|---|---|
| 1 | $ 209,000.00 | 75 | $197,604.00 | 5.03% | 6.10% | Suburban | 711.85 |
| 2 | $ 664,000.00 | 77 | $248,363.00 | 11.11% | 9.08% | City Neighborhood | 3,422.29 |
| 3 | $ 191,000.00 | 85 | $183,881.00 | 6.78% | 6.92% | Suburban | 2,782.90 |
| 4 | $ 111,000.00 | 77 | $80,268.00 | 5.16% | 7.48% | City Neighborhood | 5,874.14 |
| 5 | $ 1,040,000.00 | 85 | $442,612.00 | 9.14% | 14.98% | City Neighborhood | 3,951.13 |

Calculation of SP 505

601 ⟋ IF (Appreciation 405) is not NULL

602 ⟋ IF (Appreciation 405) <= (State Appreciation 406)

603 ⟋ IF (Appreciation 405) <= 0

604 ⟋ SP = 50

605 ⟋ ELSE IF ((Appreciation 405)/(State Appreciation 406))*100 >= 90

606 ⟋ SP = 90

607 ⟋ ELSE SP = ((Appreciation 405)/(State Appreciation 406))*100

608 ⟋ ELSE SP = 100

609 ⟋ ELSE SP = 0

FIG. 7

Calculation of Risk Value 508 ("Score")

701 — IF AV <= 0

702 — IF AP = 0
ANDIF SP = 0
ANDIF DLP = 0
ANDIF PP = 0

703 — Score = (2*(200*(1+(0.35*AV)))+400*(1+AV)+(CG+5))/9

704 — ELSEIF MV <= 0

705 — Score = (200*(1+(0.35*AV))+200*(1+MV)+AP+SP+(CG+5)+DLP+PP)/9

ELSE

706 — Score = (200*(1+(0.35*AV))+200*(1-(0.35*MV))+AP+SP+(CG+5)+DLP+PP)/9

707 — ELSE

IF AP = 0
ANDIF SP = 0
ANDIF DLP = 0
ANDIF PP = 0

708 — Score = (2*(200*(1-AV))+400*(1-AV)+(CG+5))/9

709 — ELSEIF MV <= 0

710 — Score = (200*(1-AV)+200*(1+MV)+AP+SP+(CG+5)+DLP+PP)/9

ELSE

711 — Score = (200*(1-AV)+200*(1-(0.35*MV))+AP+SP+(CG+5)+DLP+PP)/9

FIG. 8

Sample Output Data

| Loan # | Borrower | Order # | Street # | Address | City | State | Zip |
|---|---|---|---|---|---|---|---|
| 1 | TestName 1 | 1 | 408 | Alpha Ave | Ann Arbor | MI | 48103 |
| 2 | TestName 2 | 2 | 5904 | Beta Ave | Alexandria | VA | 22310 |
| 3 | TestName 3 | 3 | 1230 | Gamma Ave | Tucson | AZ | 85715 |
| 4 | TestName 4 | 4 | 211 | Delta Ave | Arlington | TX | 76014 |
| 5 | TestName 5 | 5 | 2803 | Epsilon Ave | Fullerton | CA | 92835 |

| Loan # | Appraised | AVM Value | Confidence | Median Value | AVM Variance | Median Variance |
|---|---|---|---|---|---|---|
| 1 | $190,000.00 | $209,000.00 | 75 | $197,604.00 | 10.00% | 3.84% |
| 2 | $660,000.00 | $664,000.00 | 77 | $248,363.00 | 0.60% | 165.74% |
| 3 | $187,000.00 | $191,000.00 | 85 | $183,881.00 | 2.13% | 1.69% |
| 4 | $107,000.00 | $111,000.00 | 77 | $80,268.00 | 3.73% | 33.30% |
| 5 | $950,000.00 | $1,040,000.00 | 85 | $442,612.00 | 9.47% | 114.63% |

| Loan # | Appreciation | State Apprec | Demographic Location | Pop. Density | Market Stability | Score | URL |
|---|---|---|---|---|---|---|---|
| 1 | 5.03% | 6.10% | Suburban | 711.85 | Stable | 90.61 | Report |
| 2 | 11.11% | 9.08% | City Neighborhood | 3,422.29 | Increasing | 75.78 | Report |
| 3 | 6.78% | 6.92% | Suburban | 2,782.90 | Stable | 94.44 | Report |
| 4 | 5.16% | 7.48% | City Neighborhood | 5,874.14 | Stable | 84.93 | Report |
| 5 | 9.14% | 14.98% | City Neighborhood | 3,951.13 | Stable | 69.38 | Report |

FIG. 9

| Subject Property | |
|---|---|
| Client Name | Development Test Account |
| Department | N/A |
| Loan Number | 42 |
| Borrower | Testname |
| Address 1 | Zeta Ave |
| Address 2 | Irvine , CA  92604 |
| Appraised Value | $400,000 |
| Score Number | A5396 |

301 Borrower
302 Address 1
303, 304 Address 2
305, 306 Appraised Value
307 Score Number

| AVM Data | | | |
|---|---|---|---|
| Last Sales Price | $310,000 | Last Sales Date | 8/9/1999 |
| Bedrooms/Bath | 3.00/2.50 | Confidence | 90 |
| Year Built | 1978 | Lowest Reasonable | $455,000 |
| Living Area | 2142 | Highest Reasonable | $641,000 |
| Lot Size | N/A | AVM Value | $558,000 |

902
403
903
903
402

| Neighborhood Sales | | | | |
|---|---|---|---|---|
| | Comp 1 | Comp 2 | Comp 3 | Comp 4 |
| Address | 28 Eta Irvine, CA 92604 | 72 Theta Irvine, CA  92604 | 19 Iota Irvine, CA  92604 | 3 Kappa Irvine, CA  92604 |
| Beds | 3 | 2 | 3 | 2 |
| Baths | 2.5 | 2.5 | 2.5 | 2.5 |
| Built | 1978 | 1977 | 1977 | 1974 |
| Sq. Ft. | 1819 | 2000 | 2088 | 1819 |
| Lot Size | 0 | 0 | 0 | 0 |
| Prior Sale | 2/21/1979 | 10/3/1997 | 6/23/1995 | 7/25/1996 |
| Proximity | 0-.21 mile9s) | 0.3 mile(s) | 0.38 mile(s) | 0.07 mile(s) |
| Last Sale | 12/16/2003 | 11/24/2003 | 11/7/2003 | 9/12/2003 |
| Sales Price | $550,000 | $545,000 | $550,000 | $540,000 |

901

| Relevant Indicators | |
|---|---|
| Median Price | $407,371 |
| Demographic Location | Inner City |
| Population Density (p/sq. mile) | 8157.87 |
| Market Stability | Stable |

404
407
408
409

Risk Grade

| 89.67 | 508

SYSTEM AND METHOD FOR EVALUATING RISK ASSOCIATED WITH PROPERTY

BACKGROUND OF THE INVENTION

This invention relates to evaluating risk associated with a subject property. In particular, this invention pertains to evaluating risk associated with financing the purchase of, or investing in, real property. This invention also relates to evaluating the accuracy of an appraisal of a subject property and whether the subject property is a good or safe investment.

In today's competitive mortgage market, financial institutions often must quickly determine whether or not to approve a loan for the purchase of a subject property. However, such determinations expose the financial institution to a significant amount of risk. For instance, overpriced properties, or properties that are likely to decrease in value, increase the financial institution's risk that it will lose money on the transaction. Therefore, it is critical that these financial institutions quickly receive reliable information that will assist them in determining whether approving a loan for a subject property will expose them to an unacceptable amount of risk.

SUMMARY OF THE INVENTION

These problems are addressed and a technical solution achieved in the art by a system and method for evaluating risk associated with a subject property. The method includes receiving first information including a first estimated value of the subject property and storing the first information in a computer-readable memory. Further, the method includes receiving second information and storing the second information in a computer-readable memory. The second information includes a second estimated value of the subject property and property location information, such as median or average property values, appreciation information, demographic information, and population information. Based upon the received first and second information, the method includes calculating a score indicating the risk associated with the subject property.

The system of the present invention includes an input component, a memory component, an output component, and a processing component. The processing component is communicatively connected to the input component, the memory component, and the output component. The processing component is programmed to perform actions including receiving, via the input component, first information comprising a first estimated value of the subject property. The first information is stored in the memory component. The processing component also receives, via the input component, second information and stores the second information in the memory component. The second information includes a second estimated value of the subject property and property location information, such as median or average property values, appreciation information, demographic information, and population information. With the first and second information, the processing component calculates a score indicating the risk associated with the subject property. The processing component also outputs, via the output component, the calculated score.

BRIEF DESCRIPTION OF THE DRAWINGS

A more complete understanding of this invention may be obtained from a consideration of this specification taken in conjunction with the drawings, in which.

It should be noted that this specification, by convention, uses the leftmost digit of a reference numeral to indicate which figure it is introduced in. For instance, reference numeral 100 is found in FIG. 1, and reference numeral 201 is found in FIG. 2.

DETAILED DESCRIPTION OF THE EXEMPLARY EMBODIMENT OF THE INVENTION

The present invention evaluates risk associated with a subject property. According to the exemplary embodiment, a client provides an estimated value of the subject property, and the risk evaluation provides the client with an appropriate level of confidence that the estimated value is supported by the current market for the subject property. The risk evaluation accounts for factors including a second estimated value and information about the subject property's location, such as (but not limited to) appreciation information, demographic information, and population density information. The risk evaluation disclosed with reference to the exemplary embodiment assigns particular values and weights to these factors. However, one skilled in the art, after studying this specification, will appreciate that the invention is not limited to the actual weights and values assigned to the factors.

Also according to the exemplary embodiment, the risk evaluation takes the form of a risk value, or "score", provided to the client. A high score indicates low risk in the subject property. Low risk is defined herein as a high probability that the estimated value is supported by the current market. A low score, however, does not necessarily indicate high risk. Instead, a low score indicates an unlikelihood of low risk and that further evaluation, such as a data review or inspection, may be necessary.

In the context of this framework, a computer system 100 implementing the risk evaluation according to the exemplary embodiment of the present invention is described with reference to FIG. 1. The term "computer" is used in this specification to refer to any man-made device capable of processing information and includes electronic computers, optical computers, other computing technologies, and combinations thereof. As will be appreciated, this invention is not limited to the type of computer used.

Figure 1:
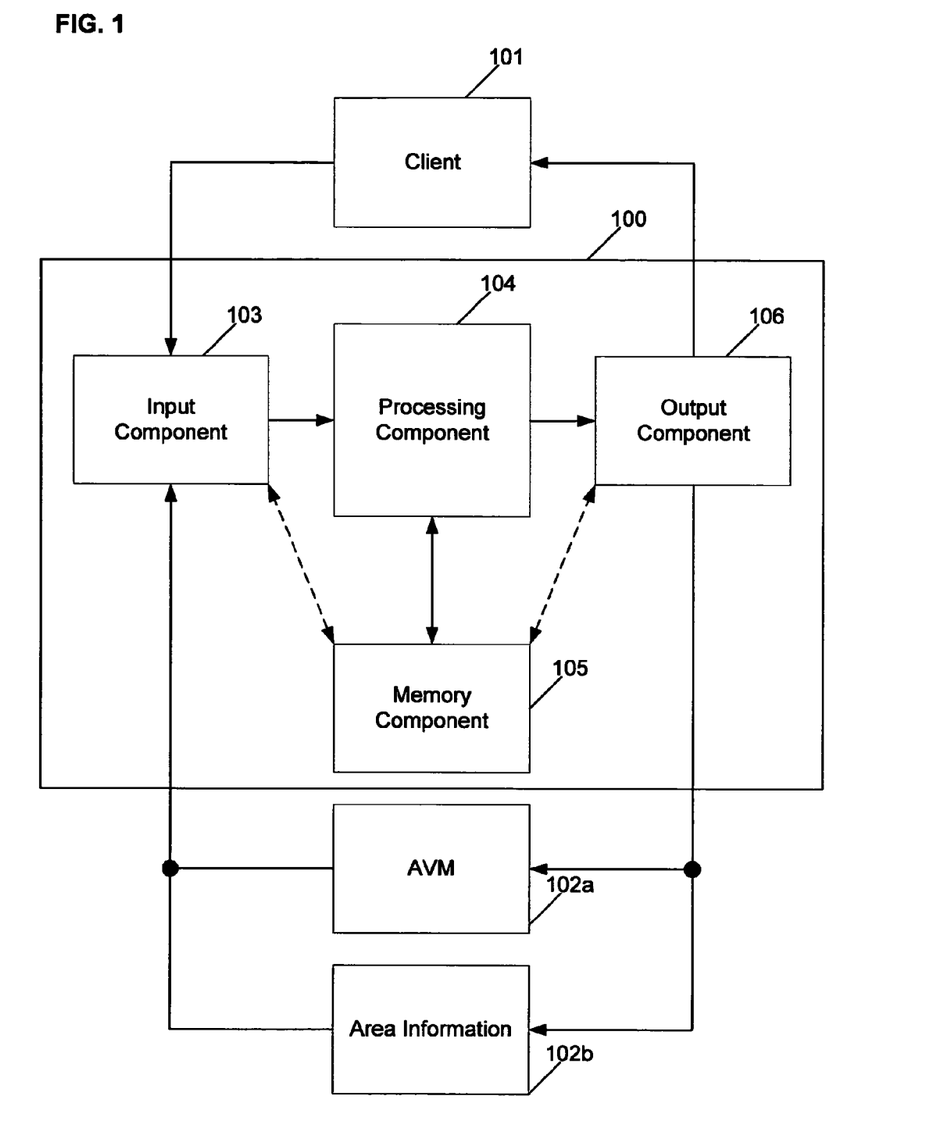
FIG. 1 illustrates a hardware arrangement according to an exemplary embodiment of the present invention.

In the arrangement if FIG. 1, an individual or entity 101 ("client") has an estimated or appraised value of a subject property, and requests from system 100 an indication of whether there is a high probability that the estimated value is supported by the current market. According to the exemplary embodiment, the subject property is real property. However, one skilled in the art, after studying this specification, will appreciate that this invention may be easily modified to apply to other types of property for which a market or investment value may be estimated and evaluated. The request from the client 101 is initiated by the transfer of input data to the system 100 from the client 101. The type of information included in the input data from client 101, referred to throughout this specification as "first input data," is the estimated value of the subject property and other information about the subject property. The contents of the first input data are described in more detail below.

The first input data from client 101 is entered via an input component 103. Input component 103 refers to any man-made device, connection, control logic, and/or functionality, whether implemented electronically or otherwise, known in the art to input data into a computer system. Exemplary input components include keyboards, mice, network connections (whether wired or wireless), and/or disk drives. However, this invention is not limited to the manner in which data is input into the computer system 100.

Input component 103 may make use of memory component 105 in the process of inputting data. Memory component 105 refers to any man-made data storage device, whether volatile or non-volatile, along with any underlying control devices, whether implemented electronically or otherwise, known in the art. As with the input component, however, this invention is not limited to the manner in which data is stored.

After the first input data is input via input component 103, the data is passed to the processing component 104 for processing. Processing component 104 refers to any man-made data processing device and any underlying control devices known in the art, whether implemented electronically or otherwise. The invention is not limited to the manner in which data is processed. After receiving the first input data, the processing component 104 may store the first input data with memory component 105, and then requests other information about the subject property from programs 102 via output/interface component 106. The other information about the subject property is used in evaluating the estimated value provided by the client 101. Output/interface component 106 may interact with memory component 105 when outputting data.

Output/interface component 106 refers to any man-made device, connection, circuitry, and/or underlying control devices, whether implemented electronically or otherwise, known in the art to transmit data outside of the computer system 100. Exemplary output/interface components include network connections (whether wired or wireless), and disk drives. However, this invention is not limited to the manner in which data is output from the computer system 100.

The processing component's 104 request for other information about the subject property is transmitted to one or more computer programs 102 designed to provide this other information, such as an automated valuation model ("AVM") 102a. The computer programs 102 are typically, but not necessarily, provided by one or more third party vendors. Alternatively, the computer programs 102 may be included within the system 100 and need not be provided externally. The information provided by computer programs 102, referred to throughout this specification as "second input data," typically includes a second estimated value of the subject property to compare against the appraised value from the client 101, a confidence score indicating a level of confidence in the second estimated value, and information pertaining to the subject property's location ("area information"). Although the second input data may be provided by a single computer program or multiple computer programs 102, the estimated value of the subject property and the confidence score are provided by an AVM 102a, and the area information is provided by a separate computer program 102b in the exemplary embodiment. The contents of the second input data are described in more detail below.

It should be noted that although input data is described as coming from a client 101 and programs 102, the invention is not limited to the sources of input data and whether or not input data comes from separate individuals, entities, locations, or programs. For instance, data received from client 101 may actually come from a program, and the data received from programs 102 may actually come from a single program. Further, programs 102 need not be programs, but may be entities.

The second input data is received via input component 103 and passed on to the processing component 104, thereby fulfilling the processing component's 104 request for additional information. The processing component 104 then calculates a risk value, or "score," indicating whether there is a high probability that the estimated value provided by client 101 is supported by the current market based upon the received first and second input data. This calculation process is described in more detail below.

Once the processing component 104 completes calculation of the score, it generates a report that is stored by memory component 105. The report is output via output component 106 to the client 101. The report includes the score and other calculated and non-calculated information pertaining to the subject property, which is described in more detail below.

The score calculation process described with reference to FIG. 1 occurs in real-time to provide the client 101 with the quick and reliable information it needs to determine whether to approve loans for the subject properties. Such process will now be described in more detail with reference to the flow chart of FIG. 2 taken in conjunction with FIG. 1. At 201, first input data is received by the system 100 from a client 101, as described with reference to FIG. 1. The input data, once received at 201 in FIG. 2, is stored in a database via memory component 105 in FIG. 1.

Figure 3:
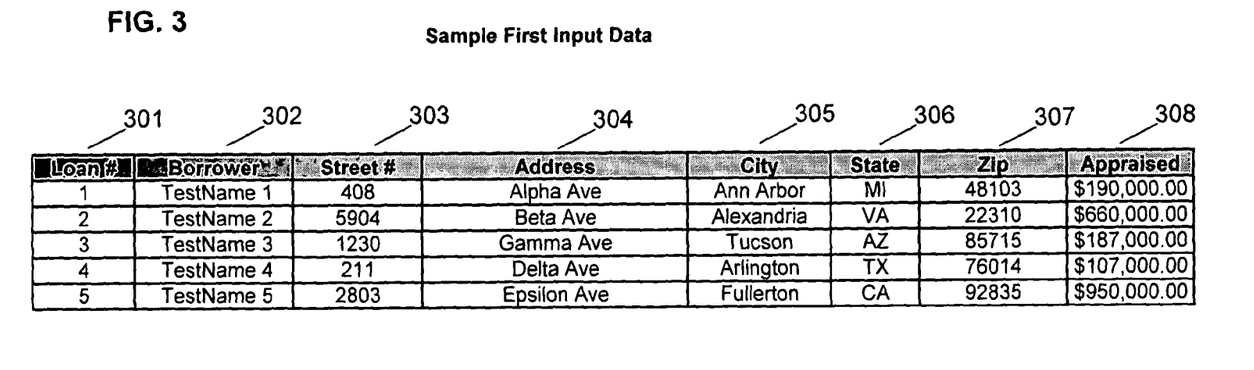
FIG. 3 is sample first input data processed by the exemplary embodiment.

First input data according to the exemplary embodiment is illustrated with reference to FIG. 3, which includes information 303-307 about the subject property and an estimated value of the property at the time of loan origination or purchase (usually the appraised value 308). As shown in FIG. 3, the first input data includes a loan number 301; a borrower name 302; a street number 303 and address 304 for the subject property; the city 305, state 306, and zip code 307 in which the subject property is located; and a first estimated or appraised value 308 of the subject property.

The first input data may include data about several properties, not just one. Such a situation is referred to herein as a "batch order," which in the exemplary embodiment, is submitted in the form of a spreadsheet as shown in FIG. 3. However, other formats for the submission of bulk data may be used. In the exemplary batch order of FIG. 3, each row of the spreadsheet includes information about one subject property for which a risk evaluation is desired.

Figure 2:
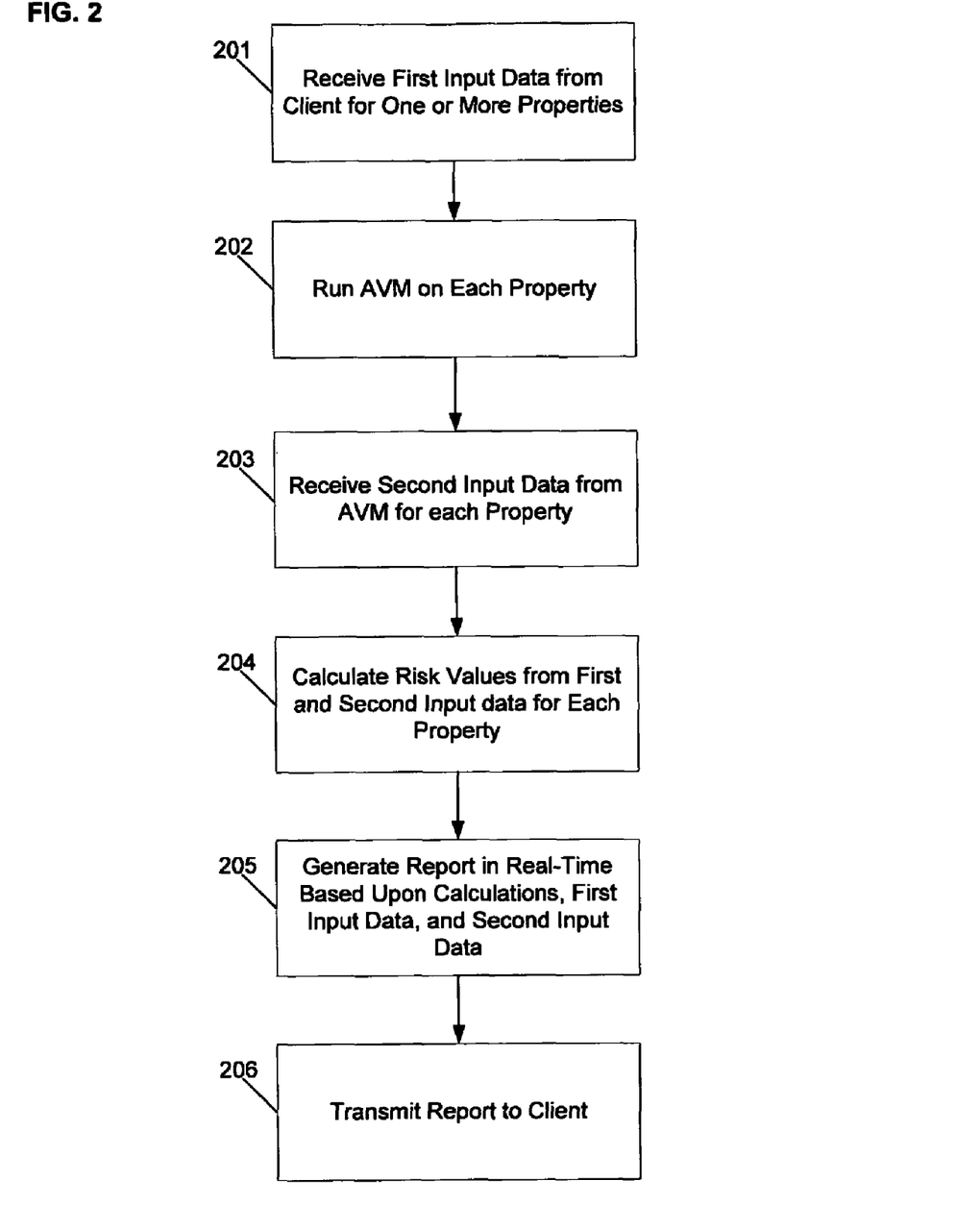
FIG. 2 illustrates a process flow according to the exemplary embodiment.

After receiving and storing the input data at 201 in FIG. 2, additional information (referred to herein as "second input data") regarding each subject property is acquired at 202. This process of acquiring additional information includes requesting automated valuation model ("AVM") information (from program 102a) and area information (from program 102b) for each subject property. The requested additional information is received at 203.

Sample second input data is described with reference to FIG. 4 and includes both AVM information (402 and 403) and area information (404-408). In particular, the AVM information includes an AVM estimated value 402 of the subject property, i.e., a second estimated value, and a confidence score 403 indicating a level of confidence that the AVM has in its estimated value 402. For instance, the confidence score 403 may indicate a margin of error in the estimated value 402 and/or a lack of comparable properties.

In the exemplary embodiment, a higher confidence score means a higher level of confidence in the AVM estimated value 402. Generation of the AVM estimated value 402 and the confidence score 403 is performed internally by the AVM 102a in FIG. 1. If the AVM 102a cannot produce AVM information for the subject property, either because the subject property was incorrectly identified or because a lack of comparison data exists, the AVM 102a will return a zero or null value for both the AVM estimated value 402 and the confidence score 403.

Figure 4:
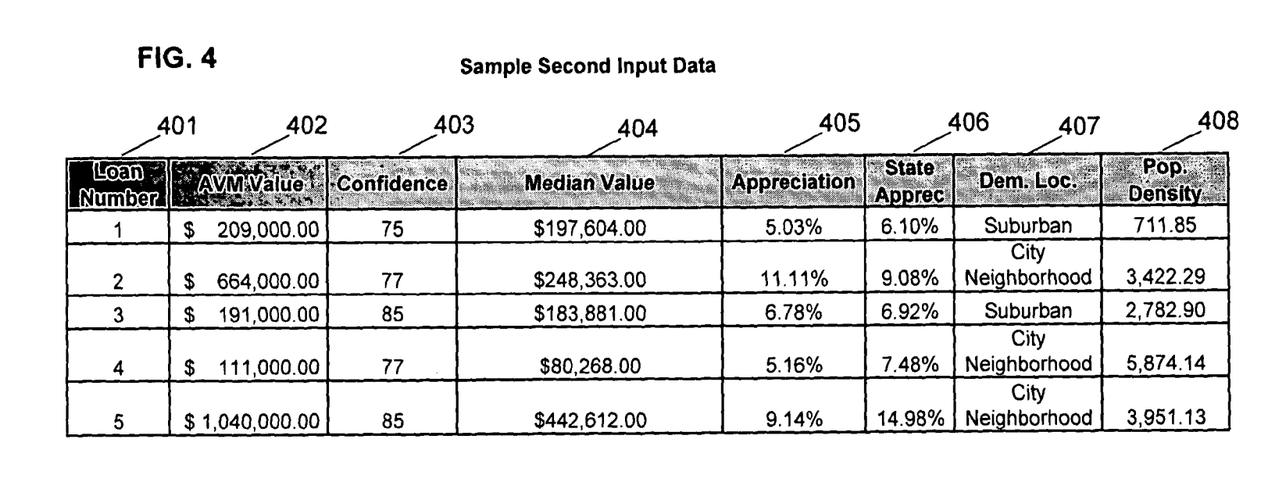
FIG. 4 is sample second input data processed by the exemplary embodiment.

In the exemplary embodiment, with reference to FIG. 4, the area information in the second input data is provided by the area information provider 102b in FIG. 1. The area information includes a median neighborhood value 404 indicating a median value of the real property sales in the subject property's local area within a predetermined period. In the exemplary embodiment, the local area is the subject property's zip code and the predetermined period is the twelve (12) months ending in the last month of the preceding quarter. For instance, if the median neighborhood value 404 is requested in November, the predetermined period is the twelve (12) month period ending in the preceding September. If a median neighborhood value 404 does not exist for the subject property, either because the subject property was incorrectly identified or because no data exists, the area information provider 102b returns a zero or null value for the median neighborhood value 404.

The area information also includes first appreciation information 405 indicating the average percentage change in the value of the real property in the subject property's local area within a predetermined period. In the exemplary embodiment, the local area and the predetermined period used for the first appreciation information 405 are the subject property's zip code and the twelve (12) months ending in the last month of the preceding quarter, respectively. Also included in the area information is second appreciation information 406 indicating the average percentage change in the value of the real property in the subject property's regional area within a predetermined period. In the exemplary embodiment, the regional area and the predetermined period used for the second appreciation information 406 are the subject property's state and the twelve (12) months ending in the last month of the preceding quarter, respectively. If first or second appreciation information 405 or 406 does not exist for the subject property, either because the subject property was incorrectly identified or because no data exists, the area information provider 102b returns a zero or null value for such information.

The area information also includes demographic location information 407 indicating the predominant neighborhood type of an area including the subject property. In the exemplary embodiment, the area used for the demographic location information 407 is the subject property's zip code. Exemplary types of demographic location information 407 include "inner city," "city neighborhood," "suburban," "small town," "rural," or "null," which indicates a lack of information or an improperly identified subject property.

Also included in the area information is population density information 408 indicating the approximate number of people per square mile in an area including the subject property. In the exemplary embodiment, the area used for the population density information 408 is the subject property's zip code. If population density information 408 does not exist for the subject property, either because the subject property was incorrectly identified or because no data exists, the area information provider 102b returns a zero or null value for population density information 408.

Referring back to 202 and 203 in FIG. 2, if an AVM (102a in FIG. 1) or an area information provider (102b in FIG. 1) fails to provide information or adequate information on the subject property, another request may be sent out to a different AVM or area information provider in an attempt to acquire acceptable second input data. The process of sending out additional requests may be repeated until the required information is received, or no other AVMs or area information providers are available.

After receiving the second input data at 203 in FIG. 2, the processing component 104 embarks on calculating scores for each subject property identified in the batch order (FIG. 3 for example) at 204. The purpose of the score, or risk value, is to provide the client 101 with an appropriate level of confidence in the supportability of the original estimated value 308 of the subject property by the current market. In the exemplary embodiment, a high score indicates a high level of confidence that the estimated value 308 is supported by the current market and, consequently, low risk. However, a low score does not necessarily indicate high risk. It more aptly indicates low confidence in low risk. In other words, a low score asserts low confidence that the estimated value 308 is supported by the current market, as indicated by recent market data, or a lack thereof. Consequently, low scores may be interpreted as requiring further evaluation of the subject property. In the exemplary embodiment, the highest possible score is 100, and the lowest is zero. Excellent scores are loosely defined as 90-100, good scores as 80-90, average scores as 70-80, and failing scores as below 70.

Figure 5:
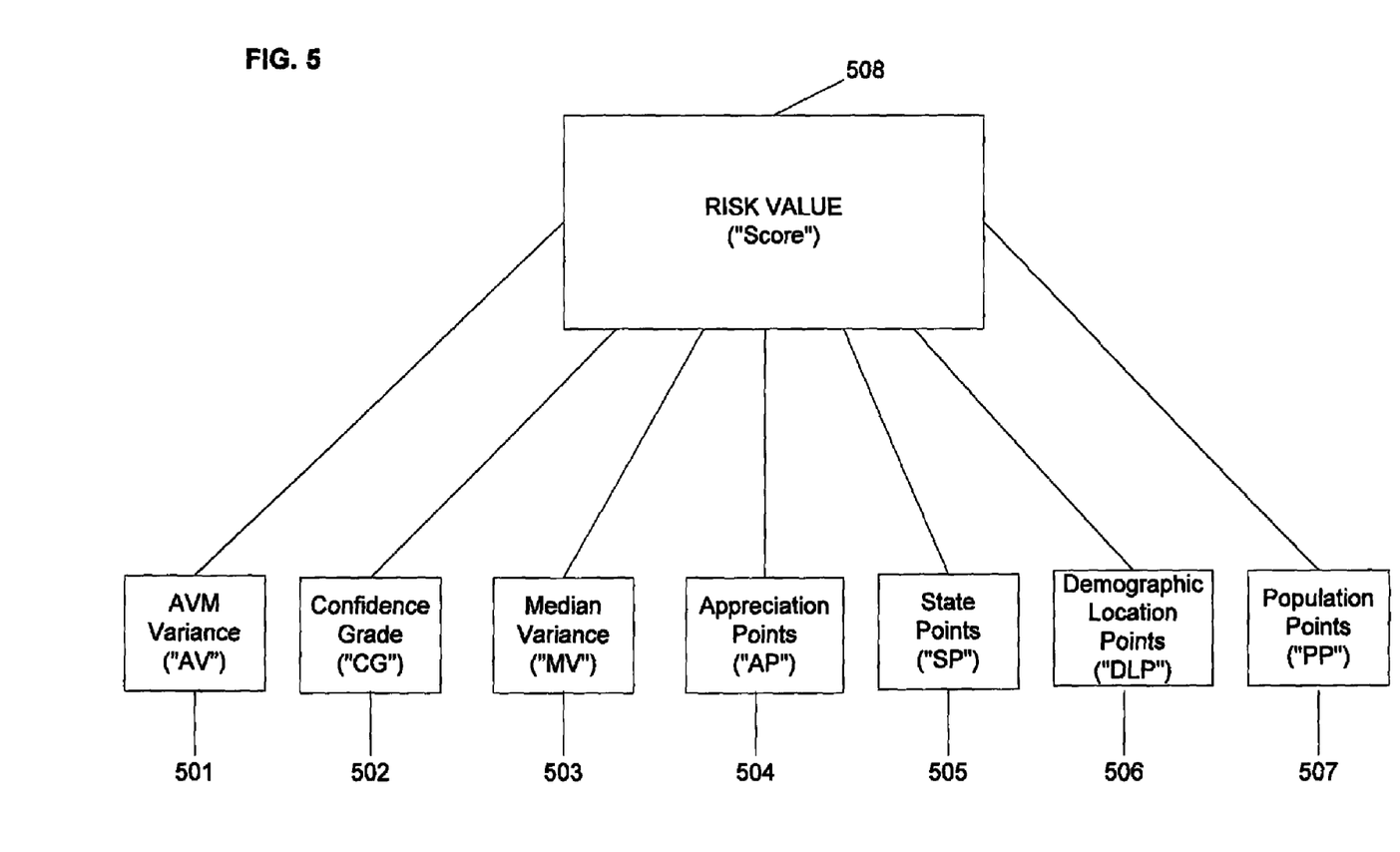
FIG. 5 illustrates the values upon which a calculated risk value ("score") is dependent, according to the exemplary embodiment.

As shown in FIG. 5, the score 508 is based upon several initial calculations. These initial calculations include: an AVM Variance ("AV") 501; a Confidence Grade ("CG") 502, which is a derivative of confidence score 403 received from the AVM 102a; a Median Variance ("MV") 503; Appreciation Points ("AP") 504; State Points ("SP") 505; Demographic Location Points ("DLP") 506; and Population Points ("PP") 507. The calculation of the score 508 is dependent upon these values, and calculation of each value, including the score 508, will be described in turn. Although the calculations of values 501 to 507 are discussed in order, a person having ordinary skill in the art will appreciate that the invention is not limited to any particular order of these calculations.

Calculation of the AVM Variance ("AV") 501 will be described first. AV 501 is a measure of how closely the AVM's 102a automated assessment 402 of the subject property, using similar properties in the immediate area, compares to the subject property's original estimated value 308. For purposes of the score 508, the greater the difference between the AVM estimate 402 and the original estimated value 308, the lower the score 508 is, indicating a likelihood that the estimated value 308 is unsupported by the current market and that additional inspection is required.

In the exemplary embodiment, a positive AV 501 means that the original estimated value 308 of the subject property is higher than the AVM estimated value 402. Conversely, a negative AV 501 means that the original estimated value 308 is lower than the AVM estimated value 402. For purposes of the score 508, a negative AV 501 is considered an indicator of lower risk, as compared to a similar positive AV 501, because as long as the AVM estimated value 402 is at least as much as the original estimated value 308, the probability that the estimated value 308 is supported by the current market is high.

Also according to the exemplary embodiment, a lack of an AVM estimated value 402 does not unduly weight AV 501 as a factor that will necessarily cause the score 508 to be a "failing" (i.e., a very low) score. To elaborate, significant reasons exist for an AVM 102a not to return data other than a lack of comparable properties. For instance, an AVM 102a may not return data because the subject property is located in a region where AVM coverage is limited, the submitted street name was misspelled, or the AVM request returned multiple matches and the appropriate match could not be determined. Because these reasons do not necessarily indicate that the original estimate 308 is unsupported by the current market, AV 501 is assigned a moderate value that will not force a failing score 508.

The exemplary embodiment implements these principles as follows. If AVM Estimate 402 is equal to zero, indicating that the AVM 102a failed to return data, AV 501 is assigned a value that moderately decreases an average score 508 for the reasons discussed above. In the exemplary embodiment, AV 501 is assigned 0.5 in this situation. If AVM Estimate 402 is greater than zero (ie., the AVM 102a returned data), then AV 501 is defined according to equation 1, below:

$$AV\ 501 = ((\text{Appraised Value 308}) - (\text{AVM Estimate 402}))/(\text{Appraised Value 308}) \quad (1)$$

However, if the absolute value of AV 501 from equation 1 is very close to zero within a threshold amount, such as 5%, AV 501 is reassigned to zero. In this situation, since the Appraised Value 308 and the AVM Estimate 402 are so close, AV 501 is determined to be effectively zero.

Alternately, if AV 501 from equation 1 exceeds some large positive or negative threshold amount, such as +50% or −50%, AV 501 is reassigned to that threshold amount. For instance, if AV 501 exceeds negative 50%, it is reassigned negative 50%, or −0.5. These large threshold amounts act as positive and negative caps to prevent an unfavorable AV 501 from single-handedly forcing a failing score 508.

As an example, reference is made to Loan #1 in FIGS. 3 and 4, where AV 501 equals ($190,000−$209,000)/($190,000)=−0.10, or negative 10%. Because the absolute value of negative 10% is not less than the minimum threshold of 5%, and because negative 10% is not less than the large negative threshold of negative 50%, AV 501 remains negative 10% in this situation.

Next, Confidence Grade ("CG") 502 will be described. CG 502 is a derivative of the Confidence Score 403 received from the AVM 102a. For the most part, CG 502 equals Confidence Score 403 in the exemplary embodiment. However, for the same reasons described with reference to AV 501, if the AVM 102a fails to return a Confidence Score 403, CG 502 is assigned a moderate value that will prevent it from single-handedly forcing a failing score 508. In particular, if Confidence Score 403 is greater than zero, indicating that the AVM 102a returned data, CG 502 is assigned Confidence score 403. However, if Confidence Score 403 is equal to zero, indicating that the AVM 102a failed to return data, CG 502 is set to a value that moderately decreases an average score 508. In the exemplary embodiment, this moderate value is 45. With reference to Loan #1 in FIGS. 3 and 4, CG 502 is assigned 75 because Confidence Score 403 is 75, which is greater than zero.

The Median Variance ("MV") 503 will now be described. MV 503 measures how closely the subject property's estimated value 308 is with the Median Value 404 of all recently sold property values in the area. For purposes of the score 508, the greater the difference is between the Median Value 404 and the original estimated value 308, the lower the score 508 is, indicating a likelihood that the estimated value 308 is unsupported by the current market and additional inspection is suggested.

According to the exemplary embodiment and contrary to the convention used for AV 501, a positive MV 503 means that the original estimated value 308 of the subject property is lower than the Median Value 404. Conversely, a negative MV 503 means that the original estimated value 308 is higher than the Median Value 404. For purposes of the score 508, a positive MV 503 is considered an indicator of lower risk, as compared to a similar negative MV 503, because as long as the Median Value 404 is at least as much as the original estimated value 308, the probability that the estimated value 308 is supported by the current market is high.

Further, a zero MV 503 is the best indicator of supportability for this factor because it means there is a high degree of probability that at least one property in the local area has the same value as the estimated value 308 of the subject property. Finally, if no Median Value data 404 is provided by area information provider 102b, MV 503 is assigned a cap that will lower the score 508, but not unduly so.

The exemplary embodiment implements these principles as follows. If the Median Value 404 is equal to or less than zero, or is null, indicating that the area information provider 102b failed to provide data, MV 503 is assigned a value that decreases an average score 508. In the exemplary embodiment, MV 503 is assigned −1 in this situation.

If Median Value 404 is greater than zero, MV 503 is defined according to equation 2, below:

$$MV\ 503 = ((\text{Median Value 404}) - (\text{Appraised Value 308}))/(\text{Median Value 404}) \quad (2)$$

However, if the absolute value of MV 503 from equation 2 is close to zero within a threshold amount, such as 5%, MV 503 is reassigned to zero. In this situation, since the Median Value 404 and the Appraised Value 308 are so close, MV 503 is determined to be effectively zero.

Alternately, if MV 503 from equation 2 exceeds some large positive or negative threshold amount, such as +/−100%, MV 503 is reassigned to that threshold amount. For instance, if MV 503 exceeds positive 100%, it is reassigned to 100%, or one. These large threshold amounts act as positive and negative caps to prevent an unfavorable MV 503 from single-handedly forcing a failing score 508.

With reference to Loan #1 in FIGS. 3 and 4, MV 503 equals ($197,604−$190,000)/($197,604)=0.03848, or approximately 3.85%. However, because 3.85% is less than 5% threshold indicating proximity in value between the Median Value 404 and the Appraised Value 308, MV 503 is reassigned to zero.

Appreciation Points ("AP") 504 will now be described. AP 504 is derived from Local Appreciation 405, which measures the likelihood that the estimated value 308 will remain supported by the market. As such, a higher Local Appreciation 405 indicates a higher likelihood that the estimated value 308 will remain supported. Accordingly, a higher Local Appreciation 405 results in an AP 504 that increases an average score 508. Conversely, a lower Local Appreciation 405 indicates a lower likelihood that the estimated value 308 will not remain supported. Therefore, a lower Local Appreciation 405 results in an AP 504 that decreases an average score 508.

Further, the lack of Local Appreciation 405 is interpreted as a lack of available local data and negatively impacts the score 508.

The exemplary embodiment implements these principles as follows. If Local Appreciation 405 is null, indicating a lack of information, AP 504 is assigned a value that lowers an average score 508. In the exemplary embodiment, AP 504 is assigned zero in this situation.

If Local Appreciation 405 is not null, and if Local Appreciation 405 is high, defined in the exemplary embodiment as greater than 10%, AP 504 is assigned a value that increases an average score 508. In the exemplary embodiment, the assigned value in this situation is 100.

If Local Appreciation 405 is not null, and if Local Appreciation 405 is less than or equal to zero (i.e., has decreased or not increased), AP 504 is assigned a value, defined as 50 in the exemplary embodiment, that decreases an average score 508.

Finally, if Local Appreciation 405 is not null, and if Local Appreciation 405 is not high (as discussed two paragraphs above), and if Local Appreciation 405 is not less than or equal to zero, AP 504 is assigned a moderate value tending to moderate the score 508. In the exemplary embodiment, this moderate value is 80.

With reference to Loan #1 shown in FIGS. 3 and 4, AP 504 is assigned 80, because Local Appreciation 405, which is 5.03%, is not null, is not high (greater than 10%), and is not less than or equal to zero.

Figure 6:
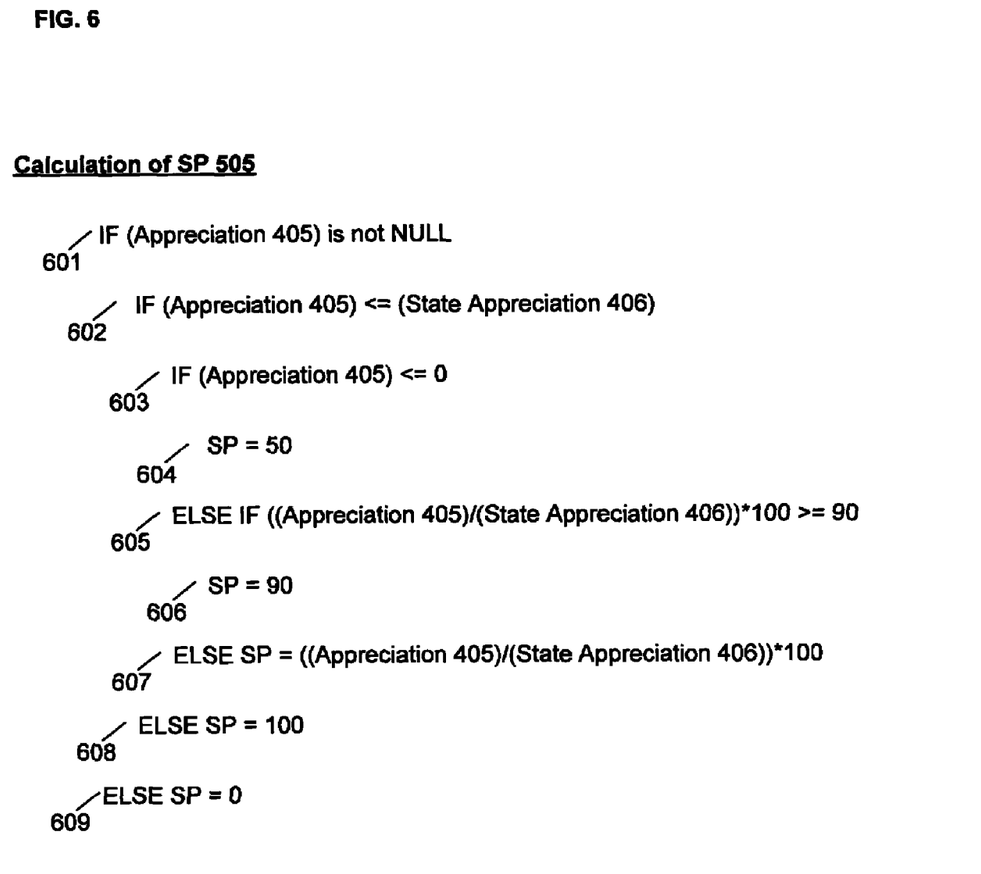
FIG. 6 shows the calculation of the State Points ("SP") illustrated in FIG. 5 according to the exemplary embodiment.

State Points ("SP") 505, will now be described with reference to FIG. 6. SP 505 is derived from Local Appreciation 405 and State Appreciation 406. The situation where Local Appreciation 405 exceeds State Appreciation 406 is associated with the highest probability that the estimated value 308 is supported by the current market, resulting in a higher score 508. Conversely, the situation where State Appreciation 406 exceeds Local Appreciation 405 is associated with a lower probability of support and a lower score 508. Further, a negative Local Appreciation 405 also indicates a lower probability of support and a lower score 508. Finally, a lack of appreciation data is interpreted as a lack of available local data and negatively impacts the score 508.

The exemplary embodiment implements these principles as follows. At 601, if Local Appreciation 405 is null, indicating a lack of data, SP 505 is assigned a value, defined to be zero, that decreases an average score 508 at 609. Otherwise, processing moves to 602. At 602, if Local Appreciation 405 exceeds State Appreciation 406, indicating that the local area is more valuable than adjacent areas, SP 505 is assigned 100 at 608, a value that increases an average score 508.

If Local Appreciation 405 is less than or equal to State Appreciation 406 at 602, the following is considered. If Local Appreciation 405 is less than or equal to zero at 603, indicating declining appreciation, SP 505 is assigned a value at 604 that decreases an average score 508. According to the exemplary embodiment, this value is defined as 50 at 604. Otherwise, if the ratio of Local Appreciation 405 to State Appreciation 406 is relatively high at 605, defined as greater than or equal to 0.9, or 90% in the exemplary embodiment, SP 505 is assigned a value that increases an average score 508 at 606. In the exemplary embodiment, this value is defined as 90 at 606. If neither of the situations at 603 and 605 hold true, SP 505 is assigned the ratio of Local Appreciation 405 to State Appreciation 406, multiplied by 100 at 607.

With reference to Loan #1 shown in FIGS. 3 and 4, Local Appreciation 405, which is 5.03%, is not null at 601, so processing proceeds to 602. At 602, the 5.03% Local Appreciation 405 is less than or equal to the 6.10% State Appreciation 406 at 602. Therefore, processing proceeds to 603. However, at 603, the 5.03% Local Appreciation 405 is not less than zero, so processing moves to 605. At 605, the ratio between Local Appreciation 405 to State Appreciation 406 (multiplied by 100) is (0.0503/0.061)*100=82.46, which is not greater than or equal to 90. Accordingly, processing proceeds to 607, where SP 505 is assigned 82.46.

The inventors have determined that the value of SP 505 is a good indicator of market stability. In particular, the higher the value of SP 505, the more stable the market is. According to the exemplary embodiment, if SP 505 is zero, market stability is unknown. If SP 505 is between 1 and 50, market stability is determined to be decreasing. If SP 505 is between 51 and 90, market stability is determined to be stable. And, if SP 505 is between 91 and 100, market stability is determined to be increasing. In the example of Loan #1 in FIGS. 3 and 4, SP 505 is 82.46, as discussed above. Accordingly, the market is determined to be stable.

Demographic Location Points ("DLP") 506 will now be described. DLP 506 measures the probability that a relatively high number of property sales were considered in the AVM estimate 402 and Median Value 404. As such, DLP 506 is derived from Demographic Location 407, which indicates the subject property neighborhood type. In populated neighborhoods, more comparison data is available, and it is easier to estimate a market value. Accordingly, more populated areas are likely to have more accurate appraisals and, consequently, a higher probability that the estimated value 308 is supported by the current market. Therefore, more populated areas result in higher scores 508. In the situation where no Demographic Location data 407 exists, a lack of available local data is presumed, and the score 508 is negatively affected.

With these principles established, if Demographic Location 407 is "Inner City" or "City Neighborhood," DLP 506 is assigned a value associated with a high probability that the estimated value 308 is supported by the current market, resulting in a higher score 508. In the exemplary embodiment, DLP 506 is assigned 100 in this situation. If Demographic Location 407 is "Suburban," DLP 506 is assigned a value associated with a moderate probability of support, which tends to moderate the score 508. In the exemplary embodiment, DLP 506 is assigned 90 when Demographic Location 407 is "Suburban." If Demographic Location 407 is "Small Town" or "Rural," DLP 506 is assigned a value reflecting a high probability that little comparison data exists and, consequently, a lower probability that the estimate 308 is supported by the current market. In the exemplary embodiment, this value is 75, which lowers an average score 508. If Demographic Location 407 is null, DLP 506 is assigned a value that significantly lowers an average score 508, indicating a lack of available local data and a likelihood that further analysis of the subject property is necessary. In the exemplary embodiment, such a value is zero. With reference to Loan #1 shown in FIGS. 3 and 4, because Demographic Location 407 is "Suburban," DLP 506 is assigned 90.

Reference will now be made to Population Points ("PP") 507. PP 507 also measures the probability that a relatively high number of property sales were considered in the AVM estimate 402 and Median Value 404. PP 507 is derived from Population Density 408, and a similar strategy to DLP 506 is employed. That is, more densely populated locations are associated with more comparison data, better market value estimates, and higher scores 508. On the other hand, more sparsely populated locations are associated with less comparison data, riskier market value estimates, and lower scores 508. Further, a lack of Population Density information 408 is interpreted as a lack of available local data, and the score 508 is negatively impacted.

Figure 7:
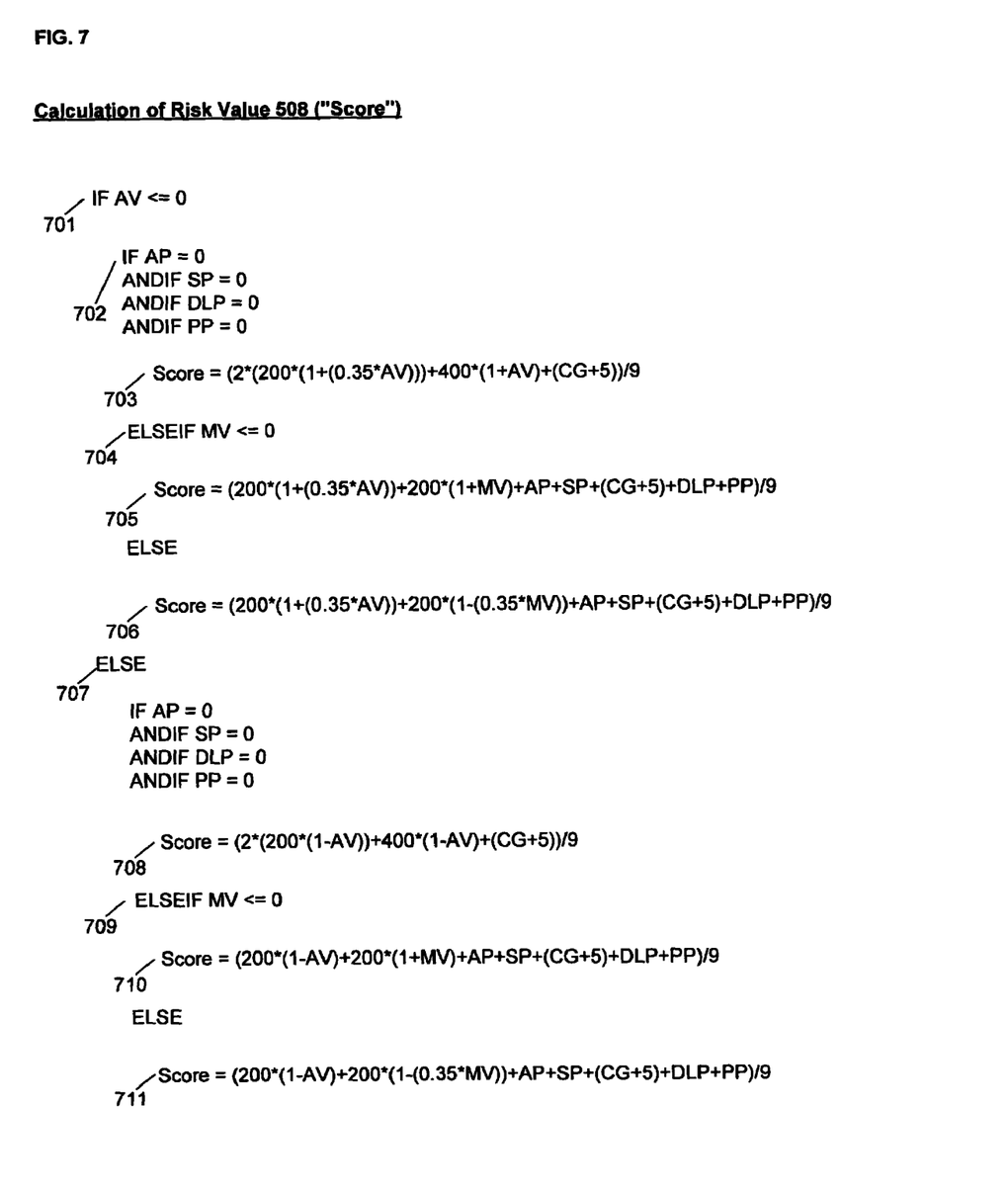
FIG. 7 shows the calculation of the score illustrated in FIG. 5 according to the exemplary embodiment.

In the exemplary embodiment, if Population Density 408 is zero or less than zero, indicating a lack of data, PP 507 is assigned zero to negatively impact the score 508. If Population Density 408 is greater than zero, but less than or equal to 100 people per square mile, the subject property's local area is presumed to be sparsely populated. Accordingly, PP 507 is assigned a value, defined to be 75 in the exemplary embodiment, that lowers an average score 508. If Population Density 408 is greater than 100, but less than or equal to 1,000, the subject property's local area is presumed to be a more densely populated area. In this situation, PP 507 is assigned 90 in the exemplary embodiment, a value that raises an average score 508. Finally, if Population Density 408 is greater than 1,000, the area is determined to be densely populated. Accordingly, PP 507 is assigned 100 in the exemplary embodiment, a value that raises an average score 508 to reflect a likely abundance of comparison data. With reference to Loan #1 shown in FIGS. 3 and 4, because Population Density 408 is 711.85, which is greater than 100, but less than or equal to 1,000, PP 507 is assigned 90. After calculating the factors 501 to 507 in FIG. 5, calculation of the score 508 is performed. Calculation according to the exemplary embodiment will be described first with reference to FIG. 7, followed by a more general discussion of the calculation. If AV 501 is less than or equal to zero at 701, processing proceeds to 702. At 702, if AP 504 equals zero, SP 505 equals zero, DLP 506 equals zero, and PP 507 equals zero, Score is calculated at 703 according to equation 3, below. It should be noted that reference numerals for the symbols in equation 3, and the remaining equations, have been left out for clarity.

$$\text{Score}=(2*(200*(1+(0.35*AV)))+(400*(1+AV))+(CG+5))/9 \quad (3)$$

If the "if statement" at 702 is determined to be false, processing proceeds to 704. At 704, if MV 503 is less than or equal to zero, Score is calculated at 705 according to equation 4, below:

$$\text{Score}=(200*(1+(0.35*AV))+(200*(1+MV))+AP+SP+(CG+5)+DLP+PP)/9 \quad (4)$$

If MV 503 is greater than zero at 704, Score is calculated at 706 according to equation 5, below:

$$\text{Score}=(200*(1+(0.35*AV))+(200*(1-(0.35*MV)))+AP+SP+(CG+5)+DLP+PP)/9 \quad (5)$$

If at 701, it is determined that AV 501 is greater than zero, processing proceeds to 707. At 707, if AP 504 equals zero, SP 505 equals zero, DLP 506 equals zero, and PP 507 equals zero, Score is calculated at 708 according to equation 6, below:

$$\text{Score}=(2*(200*(1-AV))+(400*(1-AV))+(CG+5))/9 \quad (6)$$

If the "if statement" at 707 is determined to be false, processing moves to 709. At 709, if MV 503 is less than or equal to zero, Score is calculated at 710 according to equation 7, below:

$$\text{Score}=(200*(1-AV)+(200*(1+MV))+AP+SP+(CG+5)+DLP+PP)/9 \quad (7)$$

If MV 503 is greater than zero at 709, Score is calculated at 711 according to equation 8, below:

$$\text{Score}=(200*(1-AV)+(200*(1-(0.35*MV)))+AP+SP+(CG+5)+DLP+PP)/9 \quad (8)$$

With reference to Loan #1 shown in FIGS. 3 and 4, calculated values 501-507 are summarized in Table 1, below:

TABLE 1

| | |
|---|---|
| AVM Variance ("AV") 501 | −0.10 |
| Confidence Grade ("CG") 502 | 75 |
| Median Variance ("MV") 503 | 0 |
| Appreciation Points ("AP") 504 | 80 |
| State Points ("SP") 505 | 82.46 |
| Demographic Location Points ("DLP") 506 | 90 |
| Population Points ("PP") 507 | 90 |

Applying this example to the Score 508 of FIG. 7, AV 501, which is negative 0.10 (−0.10), is indeed less than or equal to zero at 701. Accordingly, processing moves to 702. At 702, not all of AP 504, SP 505, DLP 506, and PP 507, are zero, so processing moves to 704. At 704, MV 503, which is zero, is indeed less than or equal to zero. Therefore, Score 508 is calculated at 705 according to equation 4, above. Substituting the values in Table 1 into equation 4, yields a Score of 90.61.

Having discussed the score calculation of FIG. 7, a more general consideration underlying the score calculation 508 is now presented. In the exemplary embodiment, some factors are weighted more heavily than others to allow such factors to drive the score calculation 508. For instance, at 705, AV 501 and MV 503 are counted twice (multiplied by 200) and the other factors once. It should be noted that the invention is not limited to the numeric or relative weight value of any of the score's 508 contributing factors. Further, the score calculation 508 is performed differently depending upon a few circumstances:

Circumstance #1: Lack of Geographic Data. The absence of any one or more, but not all, geographic data points for a given subject property is interpreted as lack of available local data and negatively impacts the score 508. For instance, at 705 and 706, if any one of AP 504, SP 505, DLP 506, or PP 507 are zero, the score 508 will decrease. This situation likely indicates that the appraiser may have had limited data from which to draw value calculations. However, if all geographic data points are missing, it is determined that the subject property address was submitted with incorrect information and the score 508 is calculated based solely on the AVM data. For instance, at 703, if AP 504, SP 505, DLP 506, and PP 507 are all zero, the only factors considered are AV 501 and CG 502.

Circumstance #2: Positive vs. Negative AVM Variance. In the exemplary embodiment, a positive AVM Variance ("AV") 501 means that for a given subject property, the estimated value 308 is higher than the returned AVM value 402. Conversely, a negative AVM Variance 501 means that the estimated value 308 is lower than the returned AVM value 402. For the purposes of the score 508, a negative AVM Variance 501 is considered an indicator of lower risk, resulting in a higher score, as compared to a similar positive variance 501. This difference is implemented because as long as the AVM Value 402 is at least as much as the estimated value 308, the probability of supportability is high. For instance, if the same values are inserted into the equations shown at 705 and 710 in FIG. 7, except for AVM Variances ("AV") having opposite signs, the score from equation 705 (negative AV 501) will exceed the score from equation 710 (positive AV 501).

However, a negative AVM Variance 501 is not treated exactly the same as a zero AVM Variance 501, especially for those with large absolute values and/or with accompanying low geographic factor values. Such differing treatment occurs because the original estimated value 308 may have been purposely lower than surrounding comparables due to property condition, zoning, or other issues. The formulas for this situation, shown at 703, 705, and 706 apply a multiplier of 0.35 in the exemplary embodiment to the negative AVM Variance ("AV") 501 so that a smaller percentage of the variance value is deducted from the full AVM Variance factor's potential contribution to the score 508. Conversely, in cases with a positive AVM Variance 501, as shown at 708, 710, and 711, the full AV value 501 is subtracted, subject to the caps previously described with reference to the description of AVM Variance 501.

Circumstance #3: Positive vs. Negative Median Variance. In the exemplary embodiment, a positive Median Variance ("MV") 503 means that a given subject property's estimated value 308 is lower than the Median Value 404 in the property's local area. Conversely, a negative Median Variance 503 means that the property's estimated value 308 is higher than the Median Value 404. In the exemplary embodiment, a positive Median Variance 503 is a better indicator of supportability than a corresponding negative Median Variance 503 because it means that by the definition of a median, there exist properties in the local area in the same or higher value range. For instance, all things being equal except for opposite MV 503 values; the score of 706 (with a positive MV 503) exceeds the score of 705 (with a negative MV 503).

A zero Median Variance 503 is the best indicator of supportability in this category because it means there is a high degree of probability that there exists at least one property in the local area with the same value. Therefore, a zero Median Variance 503 is not counted the same as a positive Median Variance 503. For instance, the exemplary score equations 706 and 711 apply a 0.35 multiplier to the positive Median Variance 503 similar to that of the negative AVM Variance 501. In the situation where a negative Median Variance 503 exists, the full absolute variance value is subtracted, subject to the caps previously described with reference to the description of Median Variance 503.

Figure 8:
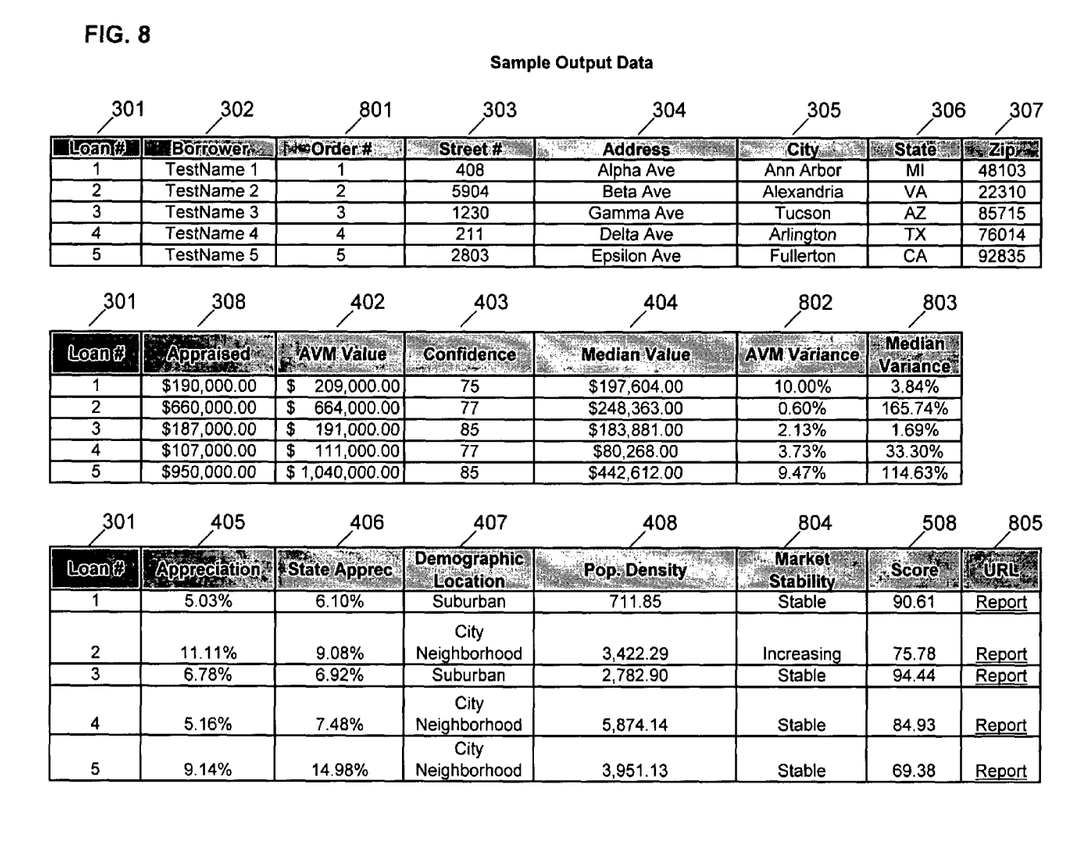
FIG. 8 is sample output data generated from the sample input data of FIGS. 3 and 4, according to the exemplary embodiment.

Referring back to FIG. 2, the manner in which the scores have been calculated for each property at 204 has now been described. After completing these calculations, reports ("output data") are generated at 205. In the exemplary embodiment, the reports are in an electronic format capable of displaying on a computer display. Sample output data is shown at FIG. 8, wherein previously described data fields maintain their previously mentioned reference numerals. In the exemplary embodiment, the output data comprises populating a spreadsheet with all input and calculated data. Although FIG. 8 shows three separate sections, the data shown in FIG. 8 would preferably be a single set of rows connected end-to-end. To simulate this continuity, loan number 301 has been repeated for each set of rows. However, one skilled in the art will appreciate, after studying this specification, that the invention is not limited to the format of the output data.

The output data shown in FIG. 8 includes, among other things, an order number 801, an AVM variance 802, a median variance 803, the market stability indicator 804 discussed above with reference to State Points 505, the Score 508, and a link to a web page URL link 805 that brings the user to more detailed information about the selected property. The AVM variance 802 is slightly different than the calculated AV value 501 in that the AVM variance 802 is the absolute value of equation 1, above. In other words, the AVM variance 802 is made negative, and it is not adjusted with respect to any threshold values. The AVM variance 802 is presented in this manner so that the client may view the raw underlying data, without adjustment. The median variance 803 is similarly treated, in that it is the absolute value of equation 2, above, without any adjustments based upon threshold values. In other words, it is a raw median variance.

Figure 9:
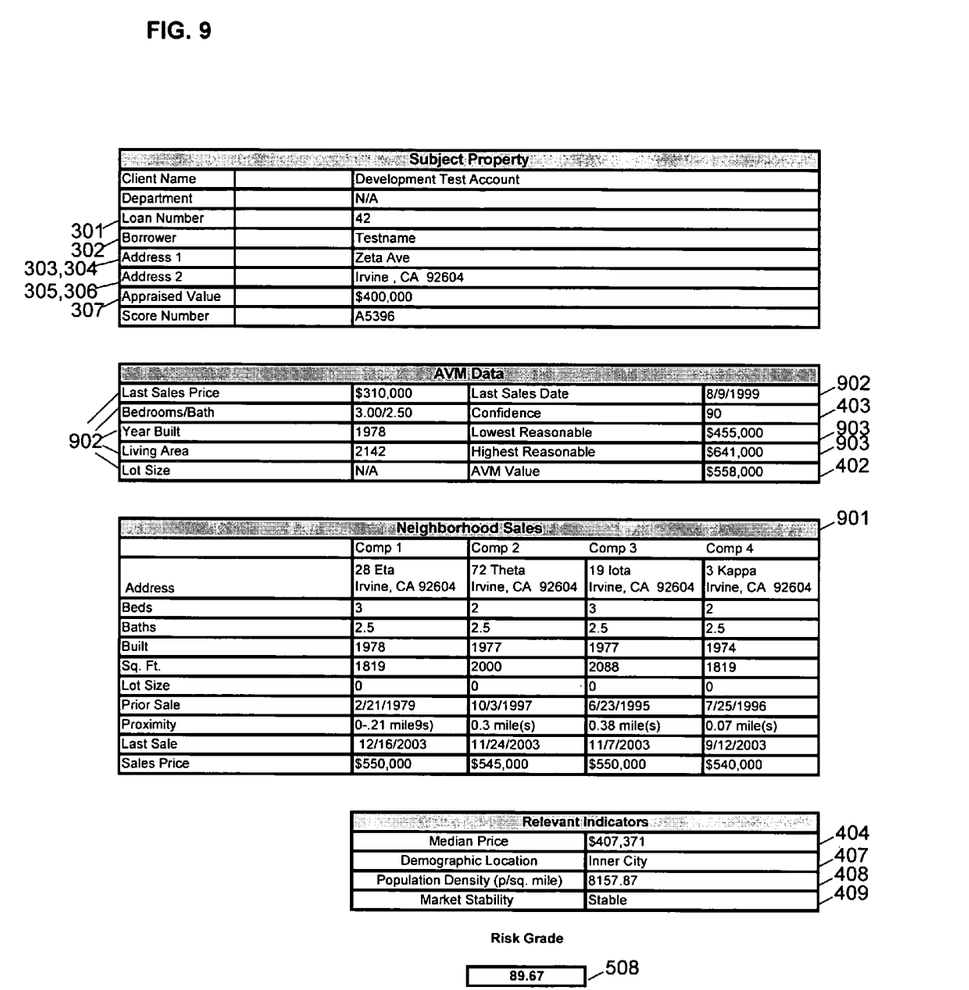
FIG. 9 illustrates a sample detail report generated by the exemplary embodiment of this invention.

When the client selects the web page URL link 805 for a particular property, a detail page is presented that displays additional information about the particular property. An example of a detail page is shown at FIG. 9, where previously described data fields are indicated by their previously identified reference numerals. The additional information in the detail page includes comparable sales information 901, property specifics 902, and AVM specifics 903. In the exemplary embodiment, the additional information in the detail page is provided by the AVM that was executed on the subject property.

The comparable sales information 901 shows what properties similar to the subject property, in terms of characteristics and location, have sold for and when. Property specifics 902 describe the characteristics of the subject property, including the number of bedrooms and bathrooms, the year it was built, the living area, lot size, and the last sales date. AVM specifics 903 describe a likely appraisal range for the AVM Estimate 402. The appraisal range includes a lowest reasonable estimate and a highest reasonable estimate.

Referring back to FIG. 2, after generating the reports and detail pages at 205, such information is transmitted to the client 101 in FIG. 1 at 206, thereby concluding the transaction.

It has now been demonstrated that the present invention evaluates risk associated with a subject property by accounting for factors including different estimated values and information about the area in which the property is located. The area information includes appreciation information, demographic information, and population density information. The risk calculation disclosed with reference to the exemplary embodiment assigns particular values and weights to these factors to quickly generate a reliable risk value. The risk value is then used by clients to assist them in determining whether or not to approve a loan on a subject property.

It is to be understood that the exemplary embodiment described herein is merely illustrative of the present invention and that many variations of the above-described embodiment can be devised by one skilled in the art without departing from the scope of the invention. For instance, although the specification is largely described in terms of real property, the invention may easily be modified to pertain to other types of properties. Also, the exemplary embodiment refers to specific "hard-coded" values in the calculation of the risk value. However, one skilled in the relevant art will appreciate that the actual values used may easily be modified and still be within the scope of the invention. It is therefore intended that all such variations be included within the scope of the following claims and their equivalents.

What is claimed is:

1. A system for evaluating risk associated with a subject property, the subject property comprising real property and the system comprising:
   an input component;
   a memory component;
   an output component; and
   a processing component communicatively connected to the input component, the memory component, and the output component, the processing component programmed to perform actions comprising:
   receiving, via the input component, first information comprising a first estimated value of the subject property;
   storing the first information in the memory component;
   receiving, via the input component, second information comprising a second estimated value of the subject property;
   storing the second information in the memory component;

calculating an automated valuation model ("AVM") variance, a median variance and an appreciation value;

calculating a risk value based upon the first information and the second information, the AVM variance, the median variance and the appreciation value, the risk value indicating the risk associated with the subject property; and outputting, via the output component, the risk value.

2. The system of claim 1 wherein the second estimated value comprises an automated valuation model ("AVM") estimate.

3. The system of claim 2 wherein calculating the AVM variance comprises calculating a difference between the first estimated value and the AVM estimate, and wherein the risk value varies according to the difference.

4. The system of claim 3 wherein the second information further comprises an AVM confidence indicator, and wherein calculating the risk value accounts for the AVM confidence indicator.

5. The system of claim 4 wherein calculating the risk value comprises assigning a confidence value based upon the AVM confidence indicator, and wherein the risk value varies according to the confidence value.

6. The system of claim 1 wherein the second information further comprises data pertaining to other real property sales occurring within a predetermined period and occurring within a predetermined area, the predetermined area including the subject property, and wherein calculating the risk value accounts for said data.

7. The system of claim 6 wherein the data pertaining to the other real property sales comprises a median value of the other real property sales.

8. The system of claim 7 wherein calculating the risk value comprises calculating a difference between the median value and the first estimated value, and wherein the risk value varies according to the difference.

9. The system of claim 1 wherein the second information further comprises:

first data pertaining to appreciation of other real property during a predetermined period and within a first predetermined area, the first predetermined area including the subject property; and second data pertaining to appreciation of other real property during the predetermined period and within a second predetermined area, the second predetermined area including the subject property, wherein the first predetermined area is included within the second predetermined area, and wherein calculating the risk value accounts for the first and second data.

10. The system of claim 9 wherein calculating the risk value comprises assigning a first appreciation value based upon the first data and a second appreciation value based upon the first and second data, and wherein the risk value varies according to the first and second appreciation values.

11. The system of claim 1 wherein the second information further comprises demographic data for a predetermined area, the predetermined area including the subject property, and wherein calculating the risk value accounts for the demographic data.

12. The system of claim 11 wherein calculating the risk value comprises assigning a location value based upon the demographic data, and wherein the risk value varies according to the location value.

13. The system of claim 1 wherein the second information further comprises population data for a predetermined area, the predetermined area including the subject property, and wherein calculating the risk value accounts for the population data.

14. The system of claim 13 wherein calculating the risk value comprises assigning a population value based upon the population data, and wherein the risk value varies according to the population value.

\* \* \* \* \*